(12) United States Patent
Schiller

(10) Patent No.: US 8,573,672 B2
(45) Date of Patent: Nov. 5, 2013

(54) END WALL ARRANGEMENT FOR AN ENGINE COMPARTMENT OF A MOTOR VEHICLE

(75) Inventor: Dirk Schiller, Celle (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/529,590

(22) Filed: Jun. 21, 2012

(65) Prior Publication Data

US 2012/0256441 A1    Oct. 11, 2012

Related U.S. Application Data

(63) Continuation of application No. PCT/EP2010/007478, filed on Dec. 9, 2010.

(30) Foreign Application Priority Data

Dec. 23, 2009 (DE) .......................... 10 2009 060 168
May 14, 2010 (DE) .......................... 10 2010 020 571

(51) Int. Cl.
*B60R 13/08* (2006.01)

(52) U.S. Cl.
USPC .................................................... 296/39.3

(58) Field of Classification Search
USPC ..................................................... 296/39.3
See application file for complete search history.

(56) References Cited

U.S. PATENT DOCUMENTS

| 4,366,977 | A | * | 1/1983 | Davis et al. ................ 296/24.41 |
| 5,197,840 | A | * | 3/1993 | Peek ............................. 411/433 |
| 6,070,928 | A | * | 6/2000 | Campbell .................... 296/39.3 |
| 6,185,848 | B1 | * | 2/2001 | Chmiel ........................... 40/1.5 |
| 6,974,172 | B2 | * | 12/2005 | Gebreselassie et al. ..... 296/39.3 |
| 7,870,931 | B2 | * | 1/2011 | Wildhaber .................... 181/293 |
| 2005/0046218 | A1 | * | 3/2005 | Campbell .................... 296/39.3 |

FOREIGN PATENT DOCUMENTS

| DE | 42 12 704 A1 | 10/1993 |
| DE | 195 24 120 C1 | 8/1996 |
| DE | 201 07 447 U1 | 8/2001 |
| DE | 103 39 855 A1 | 3/2005 |
| DE | 10 2004 022 895 A1 | 12/2005 |
| DE | 20 2004 009 726 U1 | 12/2005 |

* cited by examiner

*Primary Examiner* — Dennis Pedder
(74) *Attorney, Agent, or Firm* — Muncy, Geissler, Olds & Lowe, PLLC

(57) ABSTRACT

An end wall arrangement for an engine compartment of a motor vehicle is provided that includes an end wall, at least one component mounted on the end wall, and a planar covering element having sound-absorbing properties. The covering element is provided with at least one flap having heat-insulating properties and being configured optionally to cover the at least one component or to render the component accessible.

19 Claims, 2 Drawing Sheets

END WALL ARRANGEMENT FOR AN ENGINE COMPARTMENT OF A MOTOR VEHICLE

This nonprovisional application is a continuation of International Application No. PCT/EP2010/007478, which was filed on Dec. 9, 2010, and which claims priority to German Patent Application Nos. DE 10 2009 060 168.6, which was filed in Germany on Dec. 23, 2009, and to DE 10 2010 020 571.0, which was filed in Germany on May 14, 2010, and which are herein incorporated by reference.

BACKGROUND OF THE INVENTION

1. Field of the Invention

The present invention relates to an end wall arrangement.

2. Description of the Background Art

In some motor vehicles, additional heat shielding plates are used for particularly high-performance engines and diesel engines in order to protect the brake lines and the air conditioning lines for refrigerant and feed and replenishing water. The abovementioned components are typically mounted in an end wall region of the engine compartment. There are numerous components in this respect, serving to shield against high temperatures, in the end wall region of the engine compartment.

DE 10 2004 022 895 A1 discloses a sound-absorbing and planar covering element. The depicted covering element is provided for installation below the engine compartment and is equipped with a service flap which can be opened, for example, for service work (changing the engine oil, etc.). The service flap means that it is unnecessary to remove the entire covering element for service work.

However, a covering element of this type is not suitable or provided for installation on the end wall of an engine.

SUMMARY OF THE INVENTION

It is therefore an object of the present invention to propose an end wall arrangement having at least one component, wherein the component is equipped with shielding against high temperatures.

If the covering element is provided with a flap, the flap having heat-insulating properties and optionally covering or opening up the at least one component, a separate component covering can be omitted. Nevertheless, by means of the flap in the end wall covering element, installation of, and accessibility otherwise to, the parts located therebelow is made possible. A hitherto virtually unused region of the covering element is now expediently used. The at least one heat shielding plate previously required is correspondingly spared. The outlay on installation is reduced, since few, if any, heat shielding plates now have to be installed. There are also fewer apertures and holes in the acoustically sensitive end wall region.

In an embodiment of the invention, provision may be made, for example, for the covering element to be mounted on the end wall of the engine compartment by at least one, preferably three clamping disks. The fastening with clamping disks constitutes a cost-effective and reliable option of fastening the covering element to the end wall.

In a further embodiment of the invention, provision may be made for the covering element to be a planar covering element which at least partially, preferably completely, covers the end wall. To this extent, it can be ensured that the noise occurring in the engine compartment is perceived at least to a tolerable extent, if at all, in the passenger compartment.

Furthermore, provision may be made for the flap to be configured to be planar and to be mounted on the covering element by a hinge, for example a film hinge. To this extent, it can be ensured that the flap is connected captively to the covering element. It can thus be ensured, in particular in a garage, that the flap is not unintentionally lost.

Provision may also be made for the flap to be able to be optionally pivoted into an open state and into a closed state, the at least one component being accessible in an open state, and the at least one component being covered by the flap in the closed state.

Furthermore, provision may be made for the at least one component to be a brake pressure line, negative pressure line, electric line, air conditioning line or similar line. In particular, the abovementioned components are at least partially laid along the end wall of an engine compartment and preferably require shielding from the heat of the engine. Inexpensive shielding can be undertaken here by means of the end wall arrangement according to the invention, since separate heat protection plates can be omitted.

Furthermore, there can be at least two components, preferably a number of components, which can optionally be covered or opened up by the flap. In this case, for example, additional measures do not need to be taken, for example a perforation does not need to be detached if the vehicle obtains an air conditioning unit (no difference between a heating unit and an air conditioning unit). This results in less outlay on installation and also in a lower possibility of error during installation, since both components are protected against heat by the flap.

For the releasable fastening, i.e. holding, of the flap in a closed position, provision may preferably be made for the flap to be connected releasably to the end wall by at least one clamping disk, preferably two clamping disks, or by other fastening elements or heat-resistant fastening elements.

Provision may also be made to provide the flap with openings through which connections, for example water connections, which are located on the end wall can protrude in a closed state. In this respect, the flap may also be adapted in a simple manner to corresponding configurations or externally mounted components on the end wall.

In a further embodiment, provision may be made for the film hinge to be, for example, aluminum foil or for the film hinge to be at least partially composed of aluminum foil. The aluminum foil stabilizes the flap hinge and has the substantial advantage of the flap remaining stationary after being opened. A fitter consequently has both hands available for repair work. The flap does not rebound.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

An end wall arrangement according to an exemplary embodiment of the invention comprises an end wall 1, a covering element 2 with a flap 3, and at least one component.

Figure 1:
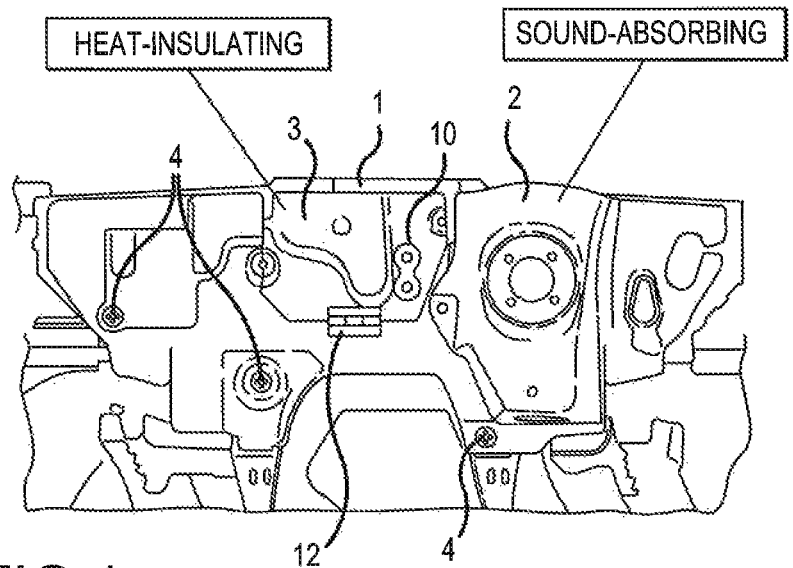
FIG. 1 shows an end wall arrangement according to an embodiment of the invention during the installation of the covering element, in particular during the fitting of three clamping disks.

FIG. 1 illustrates the covering element 2 such as is mounted on the end wall 1 of the engine compartment by three clamping disks 4. The covering element 2 essentially involves a planar covering element which covers at least a large part of the end wall 1. It is furthermore possible to see the flap 3 which is likewise configured to be planar and is mounted on the covering element 2 by a hinge, for example, a film hinge 12 or a film hinge made of aluminum foil.

Figure 2:
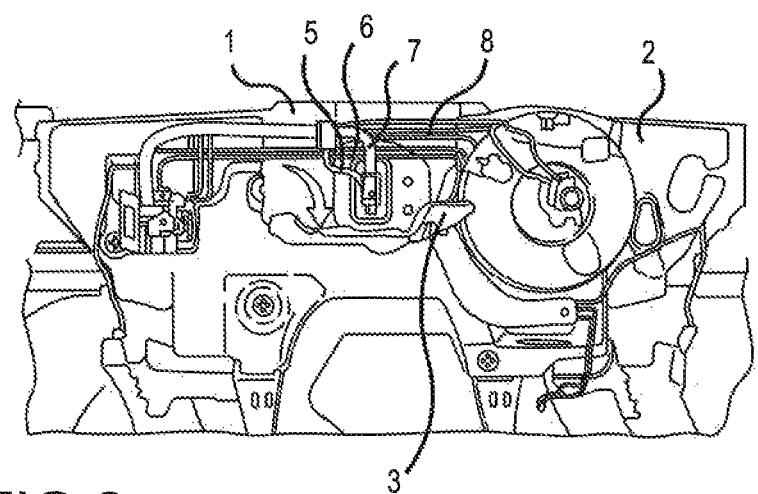
FIG. 2 shows an end wall arrangement according to an embodiment of the invention during the installation of the covering element, in particular during the installation of brake booster, ESP control unit, brake pressure line and air conditioning lines.

It can be seen in FIG. 2 that the flap 3 can optionally be pivoted into an open state. The components which are covered in a closed state of the flap 3 are accessible in this open state. It can be seen that at least one component, in particular a brake pressure line 6, 8, negative pressure line, electric line, air conditioning line 5, 7 or similar line can be at least partially covered by the flap 3 in a closed state. The abovementioned components are correspondingly accessible in an open state.

Figure 3:
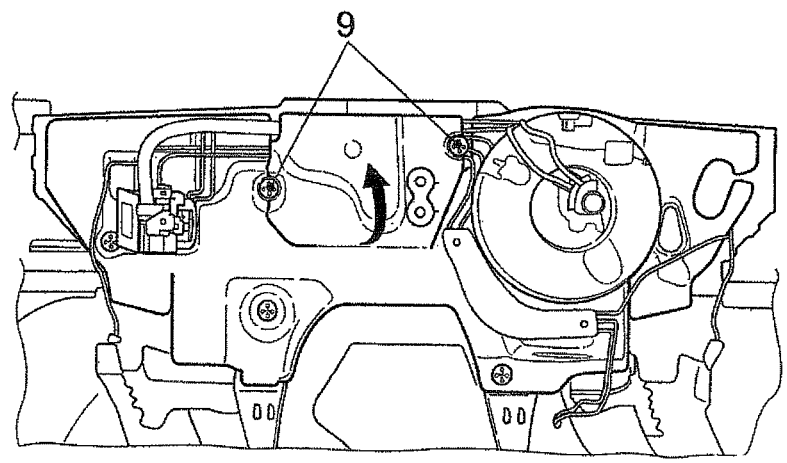
FIG. 3 shows an end wall arrangement according to an embodiment of the invention during the installation of the covering element, in particular during the closing of the flap.

It can be seen in FIG. 3 that the flap 3 can be transferred from an open state into a closed state by pivoting. In a closed state, in turn, the flap 3 can be releasably fixed in the closed state by two clamping disks 9. The flap 3 now at least partially covers the abovementioned components.

Figure 4:
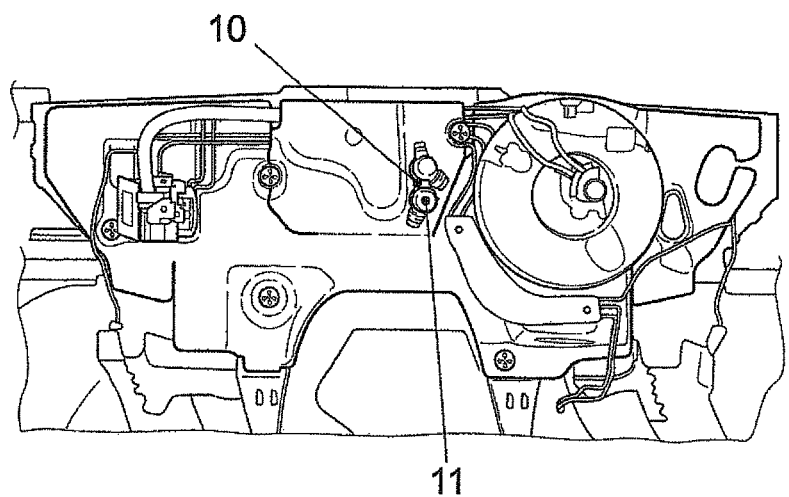
FIG. 4 shows an end wall arrangement according to an embodiment of the invention during the installation of the covering element, in particular during the installation of the water connections.

It can be seen in FIG. 4 that the flap 3 is provided with openings 10 through which, for example, water connections 11 which are located on the end wall 1 can protrude in a closed state.

The covering element 2 is produced from a material which has sound-damping, and preferably additionally also heat-insulating properties. The flap 3 is produced from a material which has sound-damping and heat-insulating properties.

During customer service in the garage, it may be necessary, due to very confined construction space conditions, to tear off the flap 3 through a perforation which is then arranged in the hinge region. After accessibility, which is now optimized, and successful repair, the separate flap 3 can be fixed at the at least two fastening points provided for this purpose.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An end wall arrangement for an engine compartment of a motor vehicle, the end wall arrangement comprising:
an end wall;
at least one component mounted on the end wall; and
a planar covering element having sound-absorbing properties, the covering element having at least one flap pivotably arranged thereon, the flap having heat-insulating properties and is configured to cover the at least one component and to provide accessibility to the at least one component,
wherein the at least one component is disposed between the flap and the end wall.

2. The end wall arrangement as claimed in claim 1, wherein the covering element is mounted on the end wall of the engine compartment by at least one clamping disk.

3. The end wall arrangement as claimed in claim 1, wherein the covering element is a planar covering element that at least partially or completely covers the end wall.

4. The end wall arrangement as claimed in claim 1, wherein the flap is configured to be planar and is mounted on the covering element by a hinge.

5. The end wall arrangement as claimed in claim 1, wherein the flap is configured to be pivotable into an open state and into a closed state, the at least one component being accessible in an open state, and the at least one component being covered by the flap in a closed state.

6. The end wall arrangement as claimed claim 1, wherein the at least one component is a brake pressure line, a negative pressure line, an electric line and/or an air conditioning line.

7. The end wall arrangement as claimed in claim 1, wherein at least two components or a plurality of components are covered by the flap or made accessible thereto via the flap being opened up.

8. The end wall arrangement as claimed in claim 1, wherein the flap is connected releasably to the end wall by at least one clamping disk or two clamping disks.

9. The end wall arrangement as claimed in claim 1, wherein the flap is provided with openings through which connections, which are located on the end wall, protrude in a closed state of the flap.

10. The end wall arrangement as claimed in claim 1, wherein the flap is attachable to the at least one planar cover element via a film hinge.

11. The end wall arrangement as claimed in claim 1, wherein the covering element is mounted on the end wall of the engine compartment by three clamping disks.

12. The end wall arrangement as claimed in claim 4, wherein the hinge is a film hinge.

13. The end wall arrangement as claimed in claim 9, wherein the connections are water connections.

14. The end wall arrangement as claimed in claim 10, wherein the film hinge is composed of aluminium foil or wherein the film hinge is at least partially composed of aluminium foil.

15. An end wall arrangement, comprising:
an end wall;
a component mounted on the end wall;
a planar covering element having sound-absorbing properties, the covering element covering the end wall;
a flap mounted on the planar covering element, the flap being composed of a material having heat-insulating properties; and
a hinge, the hinge pivotably mounting the flap onto the planar covering element,
wherein the component is disposed between the flap and the end wall.

16. The end wall arrangement according to claim 15, wherein the planar covering element has a first end and a second end, the flap being mounted on the planar covering element at a position between the first end and the second end.

17. The end wall arrangement according to claim 15, wherein when the flap is in a closed position, the planar covering element and the flap form a continuous element covering the end wall.

18. An end wall arrangement, comprising:
   an end wall;
   a planar covering element covering the end wall, the planar covering element being secured to the end wall by clamping members; and
   a component mounted on the end wall between the end wall and the planar covering such the planar covering element covers the component,
   wherein the planar covering comprises:
      a fixed main body portion extended over the end wall; and
      a moveable portion disposed within the main body portion and positioned over the component, the moveable portion configured to pivot from an open position to a closed position and the moveable portion being composed of a material having heat-insulating properties.

19. The end wall arrangement according to claim 18, wherein when the moveable portion is in a closed position, the planar covering element and the moveable portion form a continuous element covering the end wall.

* * * * *